United States Patent [19]

DenBesten

[11] Patent Number: 5,255,793
[45] Date of Patent: Oct. 26, 1993

[54] SEPARATOR FOR A MATERIAL REDUCER

[75] Inventor: Leroy E. DenBesten, Castleton, N.Y.

[73] Assignee: Denbesten, Inc., South Schodack, N.Y.

[21] Appl. No.: 870,882

[22] Filed: Apr. 20, 1992

[51] Int. Cl.⁵ .............................. B07B 13/05
[52] U.S. Cl. ................................ 209/682; 209/17
[58] Field of Search .......... 209/17, 38, 643, 682, 209/307, 659

[56] References Cited

U.S. PATENT DOCUMENTS

| | | | |
|---|---|---|---|
| 2,356,295 | 8/1944 | Yost | 209/682 |
| 3,606,176 | 9/1971 | Vodic | 209/17 |
| 4,245,999 | 1/1981 | Reiniger | 209/17 |
| 4,750,995 | 6/1988 | Fagenson | 209/17 |
| 5,123,599 | 6/1992 | Mandigian | 209/17 |

Primary Examiner—Robert P. Olszewski
Assistant Examiner—Kenneth Noland
Attorney, Agent, or Firm—Kane, Dalsimer, Sullivan, Kurucz, Levy, Eisele & Richard

[57] ABSTRACT

A separator of reduced material, obtained for example by crushing refuse, separates and discharges materials based on size, by passing it over a plate with orifices. A water tank may also be added with conveyors for separating large and heavy pieces.

10 Claims, 5 Drawing Sheets

SEPARATOR FOR A MATERIAL REDUCER

BACKGROUND OF THE INVENTION a. Field of the Invention

This invention pertains to a separator preferably operated with a waste reducer. The waste reducer breaks waste up into particles. The separator separates the particles by size and composition.

b. Description of the Prior Art

Environmentalists have raised a consciousness concerning the contamination of our environment with unsightly and virtually uncontrollable depositing of waste and debris usually at designated landfill sites. This debris may come from many sources including demolition sites, razing or gutting of existing buildings, land clearing areas, manufacturing and construction sites to mention a few.

One of the major problems and disadvantages that exist with respect to current landfill, sites include fires, many of which are fanned by underground tunnels of air caused by the bulkiness and large size of the debris. Fires of this type are generally very difficult to contain and to extinguish.

Another serious problem with respect to landfill sites is the slowness and the uncontrollable nature of the degradation of the debris also caused by the bulkiness and large size of many of the items deposited at these sites.

There have been attempts to solve the handling of waste and the landfill problems, but most have been ineffectual. For example, at many building construction and demolition sites, compactors often times receive the building debris. While compaction of this material does to some extent reduce its bulkiness, it does not reduce the size or bulkiness of the individual items. At best, compaction merely reduces the amount of air space. Compaction of debris is not an effective solution to landfill problems.

Certain machinery has been proposed for reducing the size of debris, but these machines have their limitations, particularly in terms of efficiency, power requirements, lack of speed, and in many instances, the inability to handle relatively large pieces of debris. Some of the known existing machinery includes "SLASHBUSTERS" offered by D & M Machine Division Inc., Montesano, Washington, "STUMPMASTER" marketed by Stumpmaster, Inc., Rising Fawn, Georgia and the M80 Grapple loading Portable Universal Refiner marketed by Universal Refiner Corporation, Montesano, Washington. Augers have also been proposed but usually require too much power and cannot reduce relatively large size waste materials. Machines of the foregoing type only have limited application at best and are unable to completely resolve the landfill problems which require the ability to handle all types and sizes of debris and reduce it to a size manageable for landfill areas that would enhance the biodegradation process.

U.S. Pat. No. 4,961,543 discloses a material reducing apparatus capable of reducing various bulky waste to much smaller particulate matter useful for landfills. However, it was found that in certain applications, this particulate matter must be separated for further processing.

OBJECTIVE AND SUMMARY OF THE INVENTION

An objective of the present invention is to provide an apparatus for continuously and efficiently separating solid materials.

A further objective is to provide an apparatus which has few moving parts thereby reducing manufacturing and operating costs, and as well as repairs and downtime.

Yet another objective is to prove a separator adapted for separating objects not only by size, but also by weight, metallic content, surface area, and so on.

A separator apparatus constructed in accordance with this invention includes a chute for receiving large and small materials and having a bottom with orifices and transport means for transporting said material along said chute toward an end. Large pieces are discharged at the end while small pieces fall through the holes. A water tank may also be provided for separating wood or paper from other materials.

DETAILED DESCRIPTION OF THE INVENTION

Figure 1:
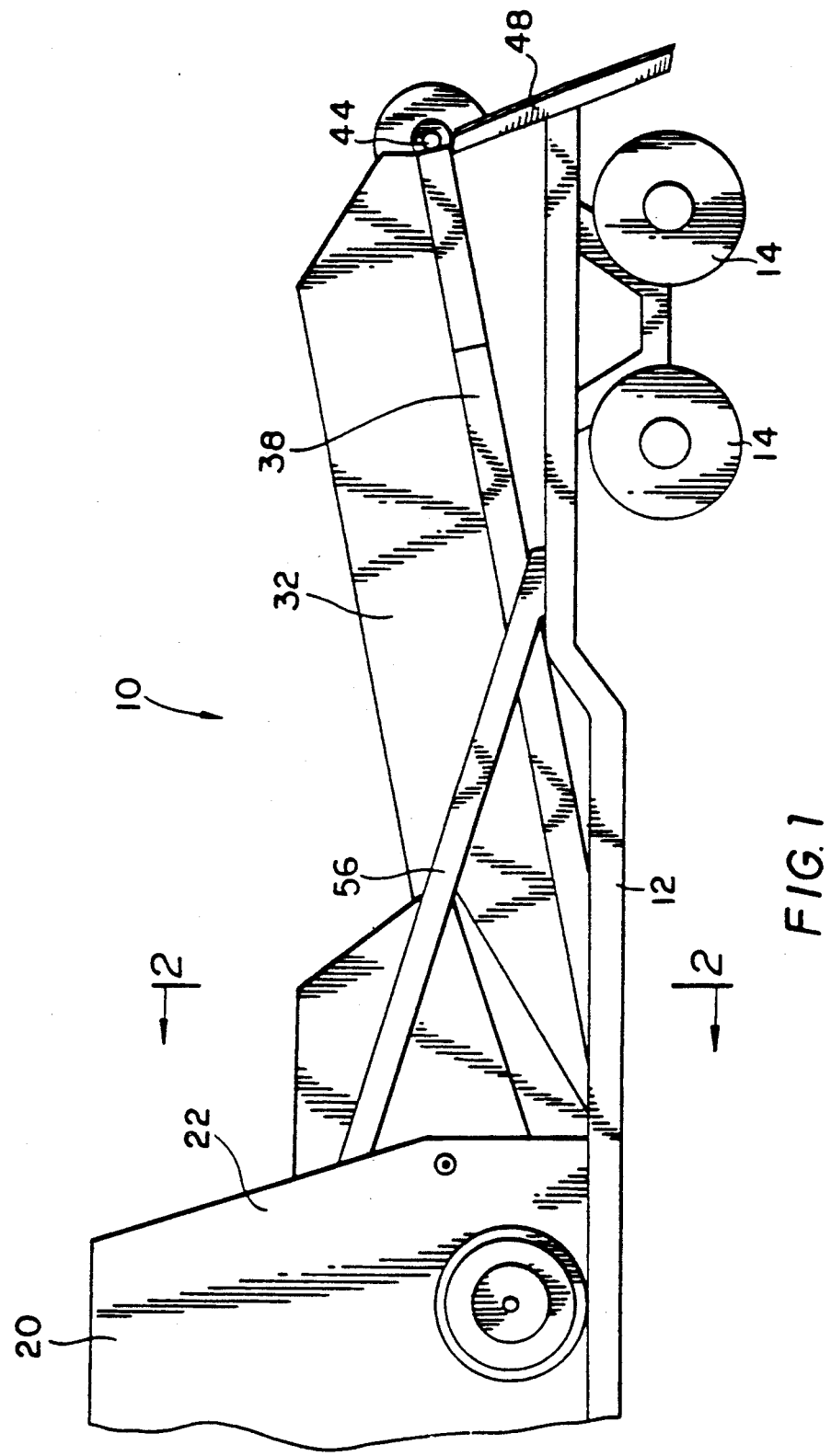
FIG. 1 shows a side elevational view of an apparatus constructed in accordance with this invention.
Figure 2:
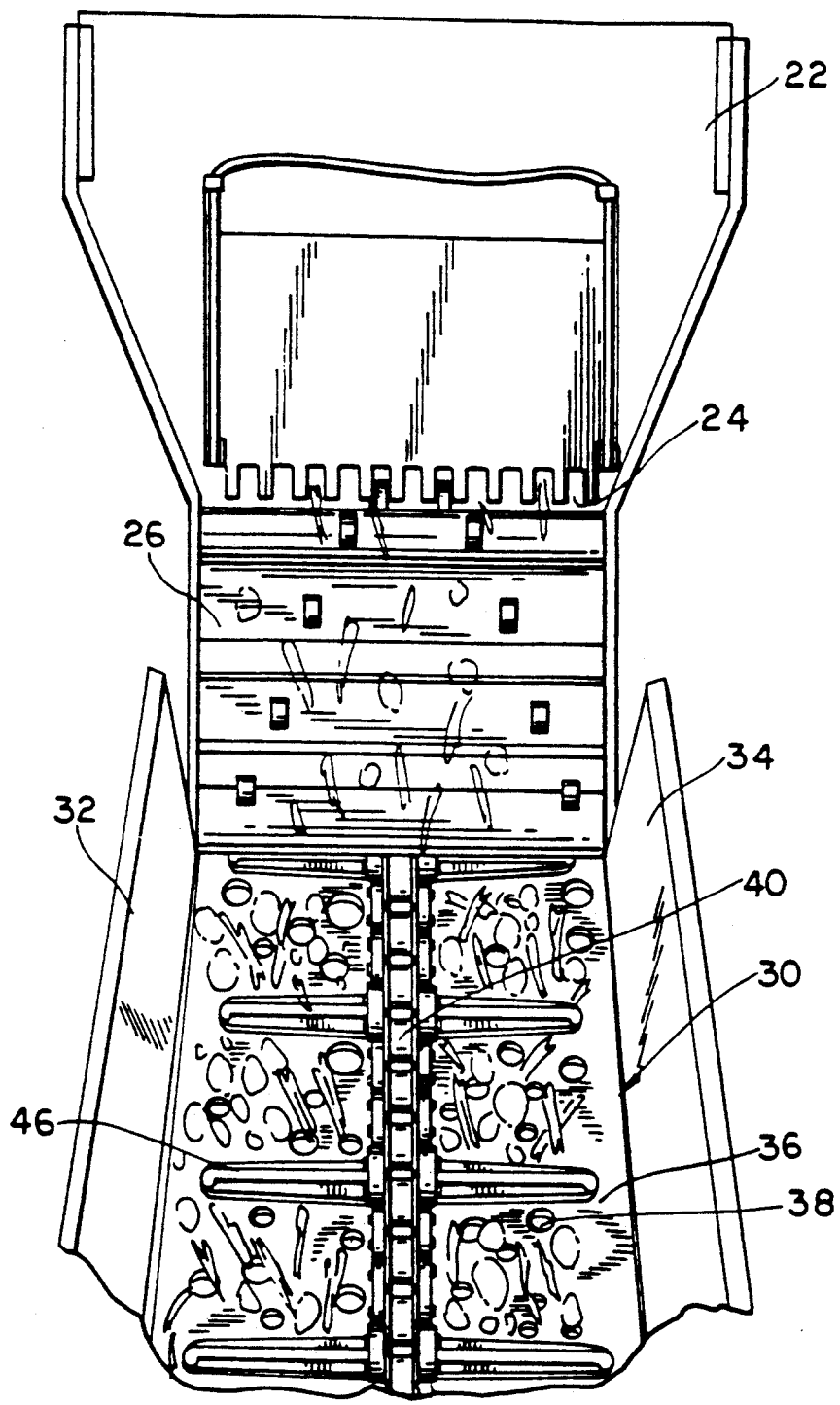
FIG. 2 shows a partial end view of the apparatus of FIG. 1.

As shown in FIG. 1, the apparatus 10 constructed in accordance with this invention consists of a platform 12 supported at one end by wheels 14. The other end of the platform may be coupled to a truck end, a trailer, or to a material reducer device 20 as disclosed in U.S. Pat. No. 4,961,542. Briefly such a reducer device may include a body 22 with an opening 24 (FIG. 2) through which extends a conveyor belt which an endless chain 26. Materials to be reduced are dumped into the body 20 where they are crushed and then expelled by chain 26.

Figure 3:
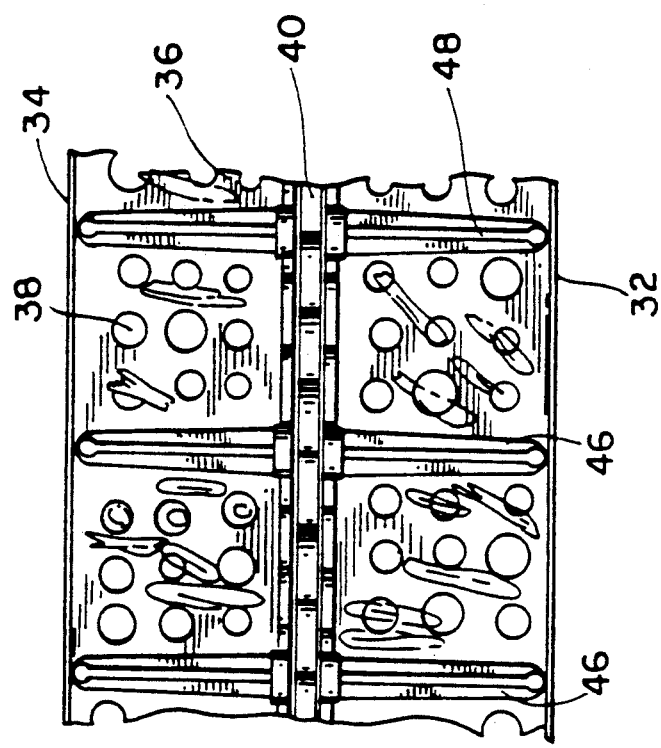
FIG. 3 shows a partial top plan view of the apparatus of FIG. 1.
Figure 4:
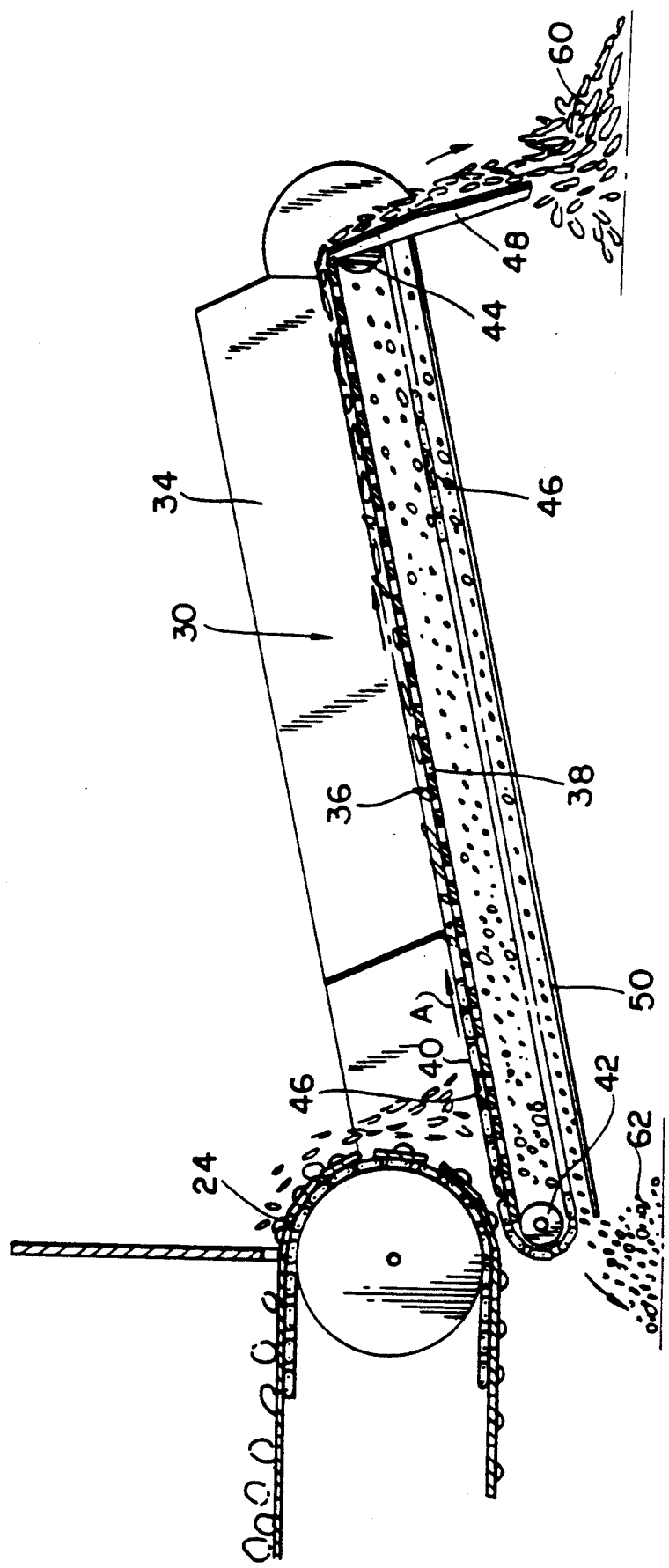
FIG. 4 shows a side elevational sectional view of the apparatus of FIG. 1.

In the present invention, the material expelled by reducer 20 is separated as follows. The apparatus includes an extended chute 30 having two side walls 32, 34. The bottom of the chute is formed by a plate 36 with a plurality of holes 38 (seen more clearly in FIG. 3). An endless chain 40 is entrained between two wheels 42, 44 (FIG. 4). One of the wheels, such as 42 is turned by any well known means (not shown) to move the chain 40 in the direction shown by arrows A. Chain 40 has a plurality of paddles 46 extending transversely to its direction of movement. A short ramp 48 is disposed at wheel 44, while a longer ramp 50 extends underneath plate 36, and is coextensive therewith. Sidewalls 32, 34 protect the chain 40 and the paddles 46. The chute 30 is supported on platform 10 by structural member 56. The operation of the separator is clear from the above description. Material from reducer 20 is deposited on plate 36 by chain 26. This material is pushed along plate 36 by paddles 46 toward ramp 48. During this operation, the smaller particulate matter falls through the holes 38. Pieces larger than holes 38 10 continue to move on plate 36 until they are deposited on ramp 50 and then fall down into a pile 60.

The smaller pieces which fell through holes 38 on to ramp 50 are moved back towards reducer 20 by the returning paddles 46 and they are deposited into a pile 62 at the end of ramp 50. In this manner the material from the reducer is quickly and easily separated into two piles by size.

Preferably the material from the separator is deposited directly (or transported) to a compost site where it is allowed to degrade into material suitable for farming.

Figure 5:
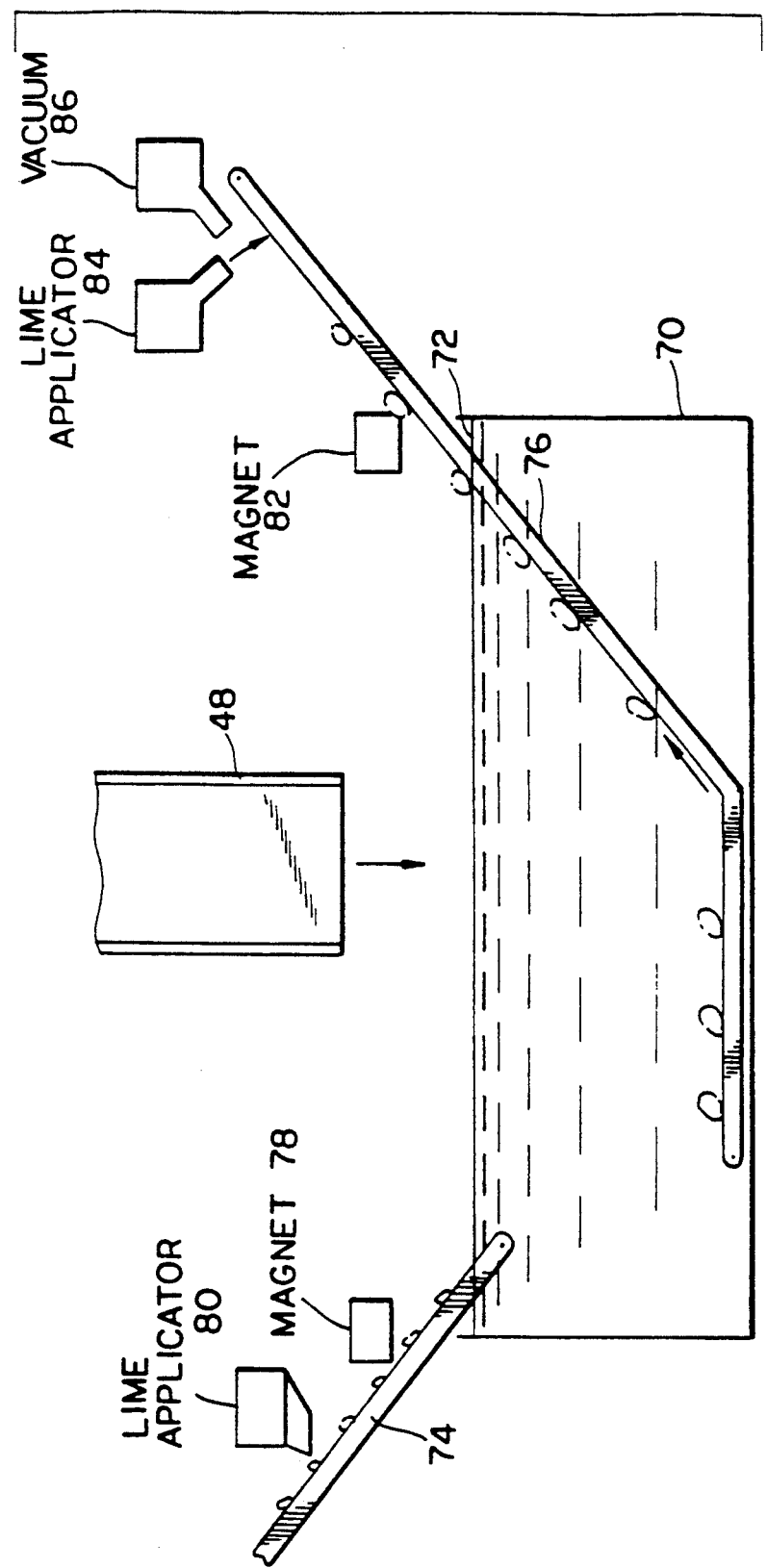
FIG. 5 shows a side elevational, schematic view of another aspect of the invention.

If desired, a further assembly may be added to the separating apparatus as illustrated in FIG. 5. In this Figure, a water tank 70 is provided, for example at the end of ramp 48. Alternatively tank 70 may be disposed to receive material from ramp 50, or even directly from the reducer 20. Tank 70 is filled with water to the level 72. A first conveyor belt 74 extends to just below the surface level of water at 72, while a second conveyor belt 76 is disposed at the bottom of the tank 70, underneath ramp 48. This second conveyor belt is segmented so that it first extend horizontally at the bottom of tank and then extends at an angle out of the tank 70 as shown. Adjacent to belt 74 there are several processing station including a magnet 78 and a lime application station 80. A similar magnet 82 and lime application station 84 is provided for belt 78. One or both belts may also be provided with a vacuum station 86.

The processing of pieces at tank 70 depends on their composition. Wood and paper pieces float on the top and therefore are picked up by conveyor 74. Conveyor 74 then takes them past magnet 78 which may pick up magnetic pieces which stuck to the wood or paper for disposition. At the lime application station 80 lime is applied to the material on belt 76 to deodorize it and to insure that rodents or other pest do not disturb the material while it is degrading, as mentioned above.

Similar operations take place at the conveyor 76. In addition, plastic materials or other light objects may be picked off with vacuum system 86.

The movement of belts 74, 76 provide sufficient churning of the water in the tank to cause the material floating at level 72 to circulate until picked up by left 74. Alternatively, mixing paddles may be added into tank 72 to provide circulation.

In this manner the material from a reducer, or any other rubbish, is processed so that it can be either degraded or otherwise disposed.

Numerous other modifications can be made to this invention without departing from its scope as defined in the appended claims.

I claim:

1. A separator apparatus comprising:
   an elongated member with a plurality of orifices arranged to receive materials including large and small pieces and having a first discharge end and a second discharge end; and
   transport means comprising an endless belt disposed on said member for moving said large and small pieces toward respective discharge ends, whereby large pieces are delivered to said first discharge end, and small pieces fall thorough the orifices and are delivered to said second discharge end by said transport means.

2. The apparatus of claim 1 further comprising a bottom ramp and wherein said transport means moves said small pieces along said bottom ramp to said second discharge end.

3. The apparatus of claim 1 wherein said elongated member includes a chute having a bottom plate and two opposed sidewalls.

4. The separator of claim 3 further comprising density separating means for separating material from said chute by density.

5. The separator of claim 4 wherein said density separating means includes a tank filled with water for receiving said material, a first conveyor for picking up low density material floating on top of the water, and a second conveyor for receiving high density material.

6. The separator of claim 5 further comprising processing stations disposed along at least one of said conveyors.

7. The separator of claim 6 wherein said processing stations include a magnet for picking up magnetic material.

8. The separator of claim 6 wherein said processing stations include a lime application station for applying lime to the material.

9. The separator of claim 6 wherein said processing stations include a vacuums station for picking up light materials from the conveyor.

10. The apparatus of claim 1 wherein said transport means includes an endless chain moving in a preselected direction and a plurality of paddles for pushing said pieces along said plate.

* * * * *